US005995903A

United States Patent [19]

Smith et al.

[11] Patent Number: 5,995,903

[45] Date of Patent: Nov. 30, 1999

[54] METHOD AND SYSTEM FOR ASSISTING NAVIGATION USING RENDERED TERRAIN IMAGERY

[76] Inventors: Eric L. Smith, 6416 Whitney Ct., North Richland Hills, Tex. 76180; Kurt Zimmerman, 4004 Valdez Ct., Plano, Tex. 75074

[21] Appl. No.: 08/745,827

[22] Filed: Nov. 12, 1996

[51] Int. Cl.[6] .......................... G06F 165/00; G08G 1/137; G01C 21/00

[52] U.S. Cl. .......................... 701/211; 701/213; 701/215; 340/995; 342/357.03; 342/357.06

[58] Field of Search .............................. 701/4, 8, 9, 208, 701/211, 213, 214, 215; 342/64, 65, 357, 457, 357.03, 357.06; 340/995

[56] References Cited

U.S. PATENT DOCUMENTS

| | | | |
|---|---|---|---|
| 4,224,669 | 9/1980 | Brame | 364/433 |
| 4,682,160 | 7/1987 | Beckwith, Jr. et al. | 340/729 |
| 4,812,991 | 3/1989 | Hatch | 364/458 |
| 5,148,179 | 9/1992 | Allison | 342/357 |
| 5,450,345 | 9/1995 | Raymer et al. | 364/453 |
| 5,475,594 | 12/1995 | Oder et al. | 364/424.06 |
| 5,488,563 | 1/1996 | Chazelle et al. | 364/461 |
| 5,566,073 | 10/1996 | Margolin | 364/449 |
| 5,721,679 | 2/1998 | Monson | 364/424.07 |
| 5,751,576 | 5/1998 | Monson | 364/188 |
| 5,839,080 | 11/1998 | Muller et al. | 701/9 |

*Primary Examiner*—Michael J. Zanelli
*Attorney, Agent, or Firm*—Reneé Michelle Larson

[57] ABSTRACT

A digital computer system for displaying a computer generated terrain representing a 3-dimensional depiction of the real world terrain surrounding a vehicle in real-time while the vehicle is in motion. This 3-D (3-Dimensional) image is rendered in real time while the vehicle is in motion and uses Global Positioning System (GPS) or differential GPS (dGPS) data available from a GPS unit and translates that data into virtual space within an Image Generation Processing block of the digital computer system. The digital computer system generates a virtual world 3-D image representing the eye-point position of the vehicle and directional vector into a terrain database. Using the latitude, longitude, and altitude supplied from the GPS unit as the eye point position into a virtual world using a terrain database, the Image Generation Processing block has a render engine capable of rendering a depiction of the terrain outside of the vehicle, as would be seen in high visibility conditions, regardless of weather, lighting and atmospheric conditions.

20 Claims, 3 Drawing Sheets

10

12 GPS UNIT

18 TERRAIN DATABASE

20 TERRAIN ACQUISITION

16 LOCATION CALCULATIONS

14 POSITION INFORMATION

22 OTHER INPUTS (RADAR, TCAS, etc.)

24 IMAGE GENERATION PROCESSING

26 DISPLAY: RENDERED SCENE

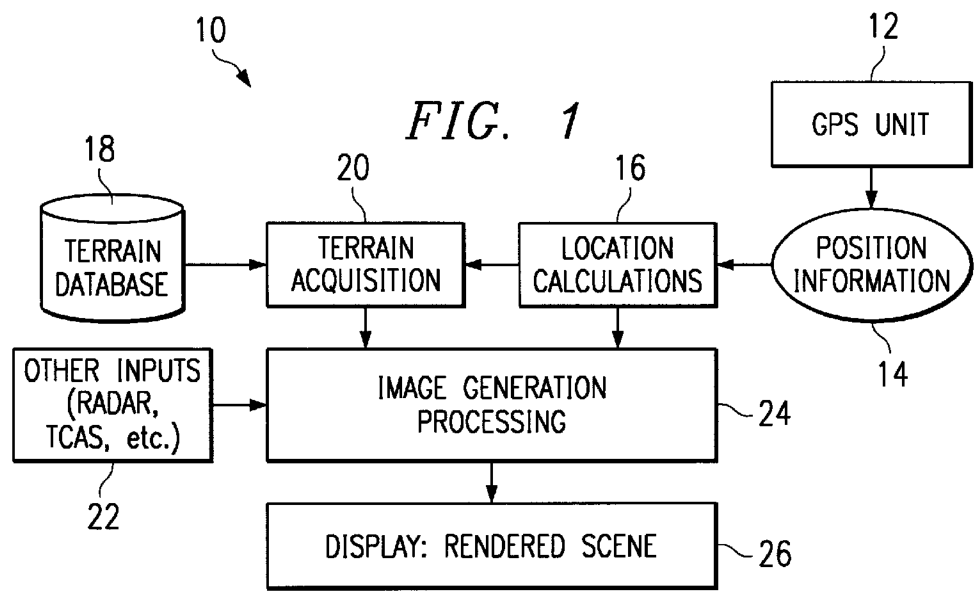
FIG. 2
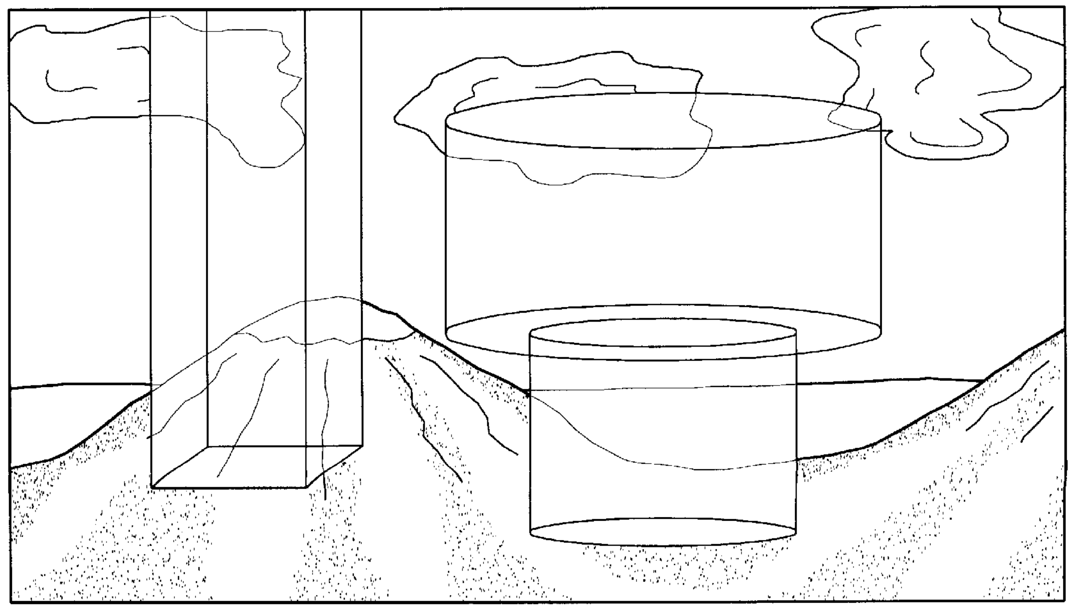

METHOD AND SYSTEM FOR ASSISTING NAVIGATION USING RENDERED TERRAIN IMAGERY

FIELD OF THE INVENTION

The present invention relates generally to information display systems and more specifically to a digital system for generating a 3-Dimensional (3-D) representation of real-world terrain which closely approximates the view seen when actually looking at the real-world terrain.

BACKGROUND OF THE INVENTION

In the navigation of a vehicle over a prescribed route contour maps are commonly used to provide an indication of the terrain over which the vehicle is traveling. The information afforded by contour maps, assorted vehicle instrumentation, and visual observation enables the operator to navigate the vehicle as it travels along its prescribed route. Thus, a pilot navigating an aircraft, for instance, uses contour maps, instrumentation readings and visual observation in order to determine altitude and other course parameters have traditionally defined a navigational instrument used primarily to aid in the navigation of the vehicle along a pre-defined path.

U.S. Pat. No. 4,682,160 issued to Beckwith Jr. et al. on Jul. 21, 1987, describes a system which generates a real time perspective view of the terrain lying along an aircraft's flight path for the benefit of the pilot of an aircraft employing the system. The system of the Beckwith, Jr. et al. patent accesses terrain data stored as digital information in a digital map generator and then converts the digital data into the perspective representation of the terrain which may be viewed on an appropriate input/output device, such as a cockpit CRT (cathode ray tube) instrument panel. The real time perspective representation provided to the pilot of the aircraft approximates the view the pilot would have if actually looking out a window of the aircraft during high visibility conditions.

The Beckwith et al. patent defines a hardware device that accesses terrain data which is converted into a perspective representation of the terrain which is displayed on a display device, such as a CRT instrument panel, for the pilot to see. The contour representation of the terrain on the display device represents a perspective as if the pilot were actually viewing the terrain himself during high visibility conditions. The Beckwith et al. patent offers the advantage of allowing a pilot to fly during inclement weather conditions with the aid of a display which provides terrain information of the type that would be available to the pilot's naked eye during high visibility weather conditions.

The hardware implementation of the Beckwith et al. patent produces a wire-frame model of the terrain over which the aircraft is flying. The Beckwith et al. patent requires a great number of contour paths in order to generate a wire-frame model of the terrain is a limitation. Additionally, the hardware approach of the Beckwith et al. patent does not provide as flexible a solution as could be achieved with a software approach.

U.S. Pat. No. 5,488,563 issued to Chazelle et al. on Jan. 30, 1996 defines a device that correlates the terrain data with the flight path of an aircraft to define an anti-collision mechanism and warning system. Memory of the device stores terrain information of a very large area of the earth. As a function of the position of the aircraft, the appropriate local map is temporarily transferred into a fast access memory of the device and an altitude envelope of the aircraft is developed given local terrain information, velocity and acceleration vectors for the zone in which the aircraft is flying. The device further has anti-collision processing capabilities such that an alarm indicates if the flight path of the aircraft violates a predetermined relation between a protection field and the altitude envelope. The Chazelle et al. patent uses either an inertial navigational unit or a radio navigational instrument to generate a synthetic image representative of a flight path trajectory that will avoid collision with the terrain over which the airplane is flying. The synthetic image representative of a flight path trajectory is not a 3-D image of the terrain over which the airplane is flying.

The flight management technology of the Chazelle et al. patent studies terrain curves in order to calculate an exit path for the airplane. The positional information required in order to calculate the exit path necessarily includes flight information parameters that must be supplied by the flight management system of the aircraft. This is clearly shown by Informations in flight block 2 of FIG. 2 of the Chazelle et al. patent. Such flight parameters would include information with regard to the inertial unit 20, radio navigational instrument 21, and Radio-altimeter 22 all shown in FIG. 3. The inertial unit 20 provides information on the velocity and acceleration of the aircraft from which the angle of incidence, yaw, slope, pitch, heading, and bank may be determined. The angular values are used in the vicinity of the acceptable flight deck of the aircraft.

There is currently an unmet need in the art to be able to provide a navigator of a vehicle with terrain information over which the vehicle is traveling regardless of weather and visibility conditions in a manner that is not dependent upon trip information such as velocity and acceleration of the vehicle and in a manner that is more flexible than the hardware solution to be found in the prior art. There is a need in the art for the terrain information to be a 3-D, non-wire frame image different from the synthetic image representative of an exit path generated by the invention of the Chazelle et al. patent. Additionally, there is an unmet need in the art to provide such terrain information to navigators of a variety of vehicle types including, but not limited to, aircraft.

SUMMARY OF THE INVENTION

It is an object of the invention to be able to provide a navigator of a vehicle with terrain information over which the vehicle is traveling regardless of weather and visibility conditions in a manner that is not dependent upon trip information such as velocity and acceleration of the vehicle and in a manner that is more flexible than the hardware solution to be found in the prior art.

It is further an object of the invention to provide such terrain information to navigators of a variety of vehicle types, including but not limited to aircraft.

Therefore, in accordance with the present invention, a digital computer system for displaying a computer generated terrain representing a 3-dimensional depiction of the real world terrain surrounding a vehicle in real-time while the vehicle is in motion. This 3-D (3-Dimensional) image is rendered in real time while the vehicle is in motion and uses Global Positioning System (GPS) or differential GPS (dGPS) data available from a GPS unit and translates that data into virtual space within an Image Generation Processing block of the digital computer system. The digital computer system generates a virtual world 3-D image representing the eye-point position of the vehicle and directional vector into a terrain database. Using the latitude, longitude, and altitude supplied from the GPS unit as the eye point position into a virtual world using a terrain database, the device can render a depiction of the terrain outside of the vehicle, as would be seen in high visibility conditions, regardless of weather, lighting and atmospheric conditions.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawing(s), wherein:

FIG. 1 is a block diagram of the digital computer system, according to the present invention;

FIG. 2 is an illustration of the controlled and restricted zones for a particular space through which the vehicle is traveling;

DESCRIPTION OF THE INVENTION

Figure 4A:
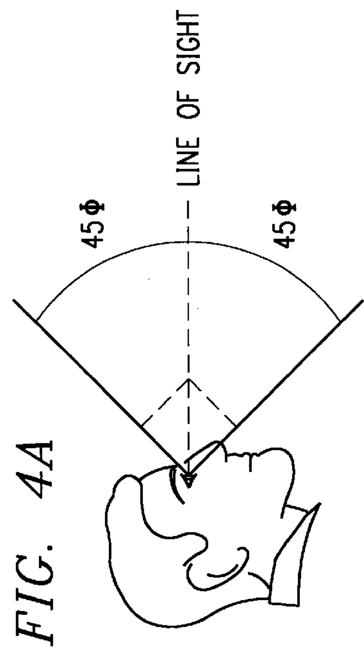
FIG. 4A illustrates the vertical field of view, according to the present invention.

The present invention is a digital computer system that correlates positional input data, such as Global Positioning Satellite (GPS) or differental GPS (dGPS) data, into virtual space within a computer system to generate the eye-point position of the vehicle into a simulated "real-world" image. A virtual reality image, which may be shaded or textured if so desired, is generated at a real-time rate which depicts the real-world terrain in front of the vehicle following the directional vector of travel in front of the vehicle. The computer-generated image is a view of 3-D space representing what would be viewed by the operator of the vehicle during ideal weather conditions and may be a filled polygonal image or a fractal image. The image generated by the digital computer system is viewed on an instrument panel of a vehicle which has access to the system. Thus the computer-generated image allows the operator to view the terrain in the vehicle's directional vector of travel in spite of restricted visibility conditions such as might be caused by smoke, ice, snow, rain, blizzards, nighttime.

The digital computer system of the present invention encompasses a software system that operates on a digital computer system. The digital computer system has three major components required to generate the real-time 3-D image: a database of terrain information, a 3-D render engine, and a display device for displaying the 3-D image rendered by the 3-D render engine. Reference to block diagram of the digital computer system 10 of FIG. 1 illustrates the informational flow between the three major components of the digital computer system 10 of the present invention: Terrain Database block 18, the render engine represented by Image Generation Processing block 24, and Display block 26 through which the operator may view the rendered image generated by Image Generation Processing block 24. The Display block 26 represents a Display device which displays for the operator the real world terrain surrounding the vehicle. The computer generated scene is a view of the 3-D space representing what would be viewed of the real world if viewed by the operator of the vehicle during ideal weather and lighting conditions.

Position Information block 14 of the digital computer system 10 contains GPS (Global Positioning Satellite) data or dGPS (differential Global Positioning Satellite) data received from GPS unit 12, hereinafter referred to as GPS data. The GPS system allows civilians access to twenty-four satellites in orbit around the earth. The GPS system takes directional information from each of three or four of the twenty-four satellites, using a 3-D triangulation measurement, in order to compute a position. It is important to note that the FM (Federal Aviation Administration), on Dec. 7, 1995, approved the use of differential GPS for instrument approaches to otherwise restricted airports. This is expected to greatly expand the number of IFR rated airports in the United States in the future.

GPS unit 12 is representative of a variety of GPS systems which use standard interface protocols, such as the National Marine Equipment Association 0183 or Trimble Standard Interface Protocol. The digital computer system 10 translates the GPS or dGPS data into virtual space within the Image Generation Processing block 24 of digital computer system 10. Image Generation Processing block 24 may be any image processing technology, including image processing technology commercially available.

In addition to the GPS data, Image Generation Processing block 24 is provided with information from the Terrain Acquisition block 20 in order to generate a computer image of the terrain over which the vehicle is traveling that may be viewed at Display block 26. Given the GPS data and terrain data, Image Generation Processing block 24 uses a render engine to generate the 3-D image. A render engine may be defined as code that will generate an image based upon terrain database information and eyepoint position. The computer image produced by Image Generation Processing block 24 and viewed at Display block 26 represents the eye-point position and directional vector of the vehicle in the simulated "real-world" image of the vehicle into the terrain database. The Display device represented by Display lock 26 may be any number of appropriate devices known in the art. For instance, the Display device may employ a CPU (central processing unit) with an embedded operating system (O/S) and code; naturally, such a Display device with embedded code must have enough RAM (random access memory) in order to execute the code. The Display device may be a storage device such as a CD ROM (compact disk read only memory) which stores data for the terrain database over which the vehicle is traveling for that given trip. The 3-D image itself may be displayed upon any display device such as an active matrix LCD (liquid crystal display) screen that is located on the instrument panel of the vehicle.

As previously discussed, the positional information of Position Information block 14 of the vehicle is acquired from a GPS system, represented by GPS Unit 12, and is used to determine the eye point position in a database of real-world terrain data. The GPS system takes directional information from each of three or four satellites to compute a position, using the 3-D triangulation method. GPS data or dGPS data provides information concerning Latitude Degrees & Minutes, Longitude Degrees & Minutes, Altitude in meters above the average/mean sea level, and Time to digital computer system 10; Velocity information may or may not be available on all GPS systems. The Latitude, Longitude, Altitude, and Time values may be used to define a position in 3-Dimensional space which is mapped to a corresponding location in a virtual reality world which will exactly mimic the real-world which actually exists outside the vehicle.

Information related to the Latitude, Longitude, Altitude, Time and Velocity of the vehicle, allows a 4-point spatial location, represented by (X, Y, Z, T), to be derived by Location Calculations block 16 given the GPS data, where X is representative of Latitude in degrees and minutes, Y is representative of Longitude in degrees and minutes, Z is representative of Altitude in meters, and T is representative of time. Typically, T is representative of time at a resolution of 0.5 second. The 4-point spatial location is useful in determining a number of useful parameters related to the trip of the vehicle. These parameters to be determined using the 4-point spatial relationship include the position of the vehicle in relation to the real-world database coordinates using either longitude/latitude or Universal Transverse Mercator units; the directional vector of travel using the last set of coordinates including heading and pitch; and the velocity, v=d/t, at which the vehicle is traveling.

The GPS data must be sampled periodically at short enough intervals to render a reliable image of the vehicle in the terrain it is transversing. Thus, Position Information block 14 of the digital computer system 10 samples GPS positional data at least every ½ second if possible or even faster if possible; if ½ second output from the GPS system is unavailable, the digital computer system 10 retrieves GPS data as rapidly as it is available. The faster the sampling, the more realistic the real-time image produced by Image Generation Processing block 24 will be. It will be understood by one of ordinary skill in the art, therefore, that sampling may occur so frequently as to be characterized as "continuous sampling" where positional input data is continuously received by Position Information block 14. The Image Generation Processing block 24 of digital computer system 10 then draws a smooth "animation" of the movement of the vehicle based upon the last known position and the speed of the vehicle.

Using the latitude, longitude, altitude, and direction of travel as the eye point position for a terrain database, the digital computer system can render a depiction of the terrain along the directional vector of the vehicle by referencing the last positional reading in order to compute the heading and pitch of the current position of the vehicle. It should be noted that location A is the next to last positional reading at time T1 while location B is the last positional reading of the vehicle at time T2. By appropriately manipulating the latitude, longitude, and altitude readings of two subsequent readings at time T1 and time T2, it is possible to generate a directional vector and to calculate the velocity of the vehicle.

Computing the heading and pitch of the current position of the vehicle is accomplished though simple geometry through the use of a lookup table, an example of which is included here for completeness:

For locations, $A=(X_1, Y_1, Z_1, T_1)$ and $B=(X_2, Y_2, Z_2, T_2)$

Heading: sin( ) lookup of:

$$\frac{(y_2 - y_1)}{\sqrt{(x_2 - x_1)^2 + (y_2 - y_1)^2}}$$

Pitch: sin( )look up of:

$$\frac{(z_2 - z_1)}{\sqrt{(y_2 - y_1)^2 + (z_2 - z_1)^2}}$$

Pitch is correlated against 90° increments for relative attitude correctness.

The vector AB defines the directional vector, and the velocity of the vehicle is obtained by:

$$\frac{\sqrt{(x_2 - x_1)^2 + (y_2 - y_1)^2 + (z_2 - z_1)^2}}{(t_2 - t_1)}$$

It should be noted that differential GPS (dGPS) data provides more accurate positional information than does GPS data. DGPS data is the result of coupling GPS data with correctional information to reduce the error inherent in the GPS system. A radio signal from a ground-based system is used to "correct" the error found in GPS data. While conventional GPS data has an accuracy of approximately 100 meters, dGPS has a much greater accuracy of approximately 1 to 10 meters. Either GPS data or dGPS data may be used in the present invention.

The digital computer system 10 correlates the eyepoint position a operator of the vehicle would have with a terrain database location provided by a GPS system in order to generate the virtual image of the real-world terrain following the directional vector of travel in front of the vehicle. This correlation can be accomplished different ways. Pure longitude/latitude data may be used or longitude/latitude data may be converted to Universal Transverse Mercator units or any similar positional locus units.

The terrain database 18 derived from a GPS system as previously mentioned is preferably based on the highest possible resolution terrain data available from sources such as the United States Geological Society, the Department of Defense, and/or the Defense Mapping Agency. The data of terrain database 18 is typically provided at 30 meter spacing and is used by Image Generation Processing block 24 to generate the 3-D image seen on Display block 26. The terrain data included in terrain database 18 is a subset of the data contained in Positional Information block 14 which is received from GPS Unit block 12. Nonetheless, the number of data points represented by terrain database 18 is quite staggering. Assuming that terrain database 18 is a sectional chart having a size of 600 NM (nautical miles)×400 NM with a resolution of 30 meter spacing, a total of 914,628,720 data points are represented! Obviously this represents too many data points to fit onto a single CD and additionally would require quite a bit of access time upon power-up of the digital computer system.

The terrain data contained within Terrain Database 18 is used to pre-generate terrain database 18 of the real-world terrain of the applicable travel plan and is put onto a storage device, such as a CD-ROM, that is made available to the digital computer system 10 upon power-up. Upon power-up of the digital computer system 10, the system 10 reads the GPS position, including directional vector information, and generates a 3-D scene depicting the forward view of the vehicle in the terrain.

Terrain Database 18, in addition to containing GPS terrain information, might also contain sectional chart information about objects such as wires, frequencies, restricted airspace, control zones, landmarks such as towers etc. This sectional chart information is integrated into the terrain database such that can be displayed to the operator upon request. The sectional chart information is used to add transparent/translucent cylinders or objects of "color" around controlled zones and/or restricted zones for the sectional area through which the vehicle is currently traveling. Referring to FIG. 2, an illustration of the controlled and restricted zones for a particular terrain, such as airspace, through which the vehicle operator is traveling is shown.

In addition to the sectional chart information and terrain information provided by terrain Database 18, the digital computer system 10 may be provided with additional information at Other Inputs block 22. Thus the digital computer system 10 can also acquire radar input from either an on-board weather radar system or from an on-board TCAS (Traffic Collision Avoidance System) thereby having the ability to incorporate weather conditions or information concerning the location of other vehicles in the region into the generated 3-D image. Such additional information provided by Other Inputs block 22 is incorporated with the terrain database and sectional chart information by Image Generation Processing block 24. As can be seen in FIG. 2, the information concerning sectional chart information, terrain information, and other parameters is extremely valuable to air traffic control management.

The positional information derived by Location Calculations block 16 from data received from Position Information block 14 is used in conjunction with the terrain database by Image Generation Processing block 24 to create the 3-D image.

Figure 3:
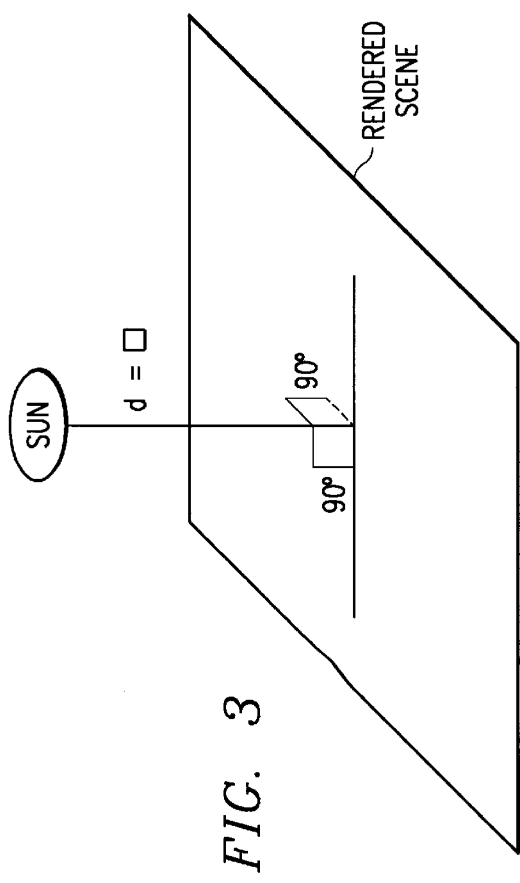
FIG. 3 illustrates the lighting angle condition used by the present invention.

The 3-D image produced by Image Generation Processing block 24 and shown at Display block 26 is a depiction of the terrain in front of the vehicle with the light source at 12:00 "high-noon" and at infinity. This default lighting condition permits the Display block 26 to always display a scene relative to "ideal" conditions, regardless of the actual conditions which might exist outside the vehicle. The lighting angle condition used by the present invention is illustrated in FIG. 3.

Figure 4B:
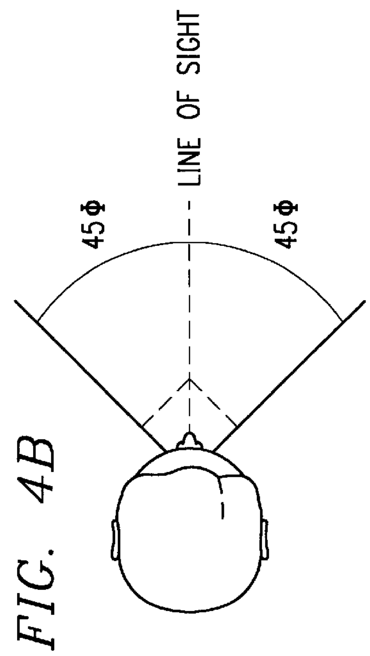
FIG. 4B illustrates the horizontal field of view, according to the present invention.

The field of view (FOV) contained in the 3-D image generated by Image Generation Processing block 24 is selectable within given parameters. The rendered FOV is selectable from 60° to 145°, horizontal HFOV (HFOV) and vertical FOV (VFOV). The FOV is selected with care since too large a FOV value may cause the scene to appear "fish-eyed" and therefore of little use; too small a FOV value may limit the amount of data displayed making the rendered image unusable. Selectable FOV allows the 3-D image to be put on different sized screens for viewing by the operator. Examples of a 90° HFOV and a 90° VFOV are illustrated in FIGS. 4A and 4B.

It should be noted that the distant terrain shown in the 3-D image generated by Image Generation Processing block 24 is generated as a function of the speed of the vehicle. Typically, the distant terrain represents the terrain a given number of seconds from the vehicle's present position along the vehicle's directional vector of travel. The distance parameter of the 3-D image is calculated in real-time so as to allow the digital software system 10 to be used with all types of vehicles, including both air and ground vehicles.

The 3-D image generated by Image Generation Processing block 24 is a representation of the terrain that may be based upon polygonal or fractal image technology. A fractal repesentation is based upon discrete points and thus generally has a higher resolution image than a filled 3-D polygonal image. For a polygonal filled 3-D image, a fairly simple calculation on each polygon in the rendered scene can result in a distance coefficient from the vehicle to the intersection of the plane of the polygon. The render engine of Image Generation Processing block 24, as previously discussed, is code that will generate the 3-D image based upon both terrain data and eyepoint position. In the case of a polygonal filled 3-D image, the render engine is able to translate the polygon list into the 3-D image.

Figure 5:
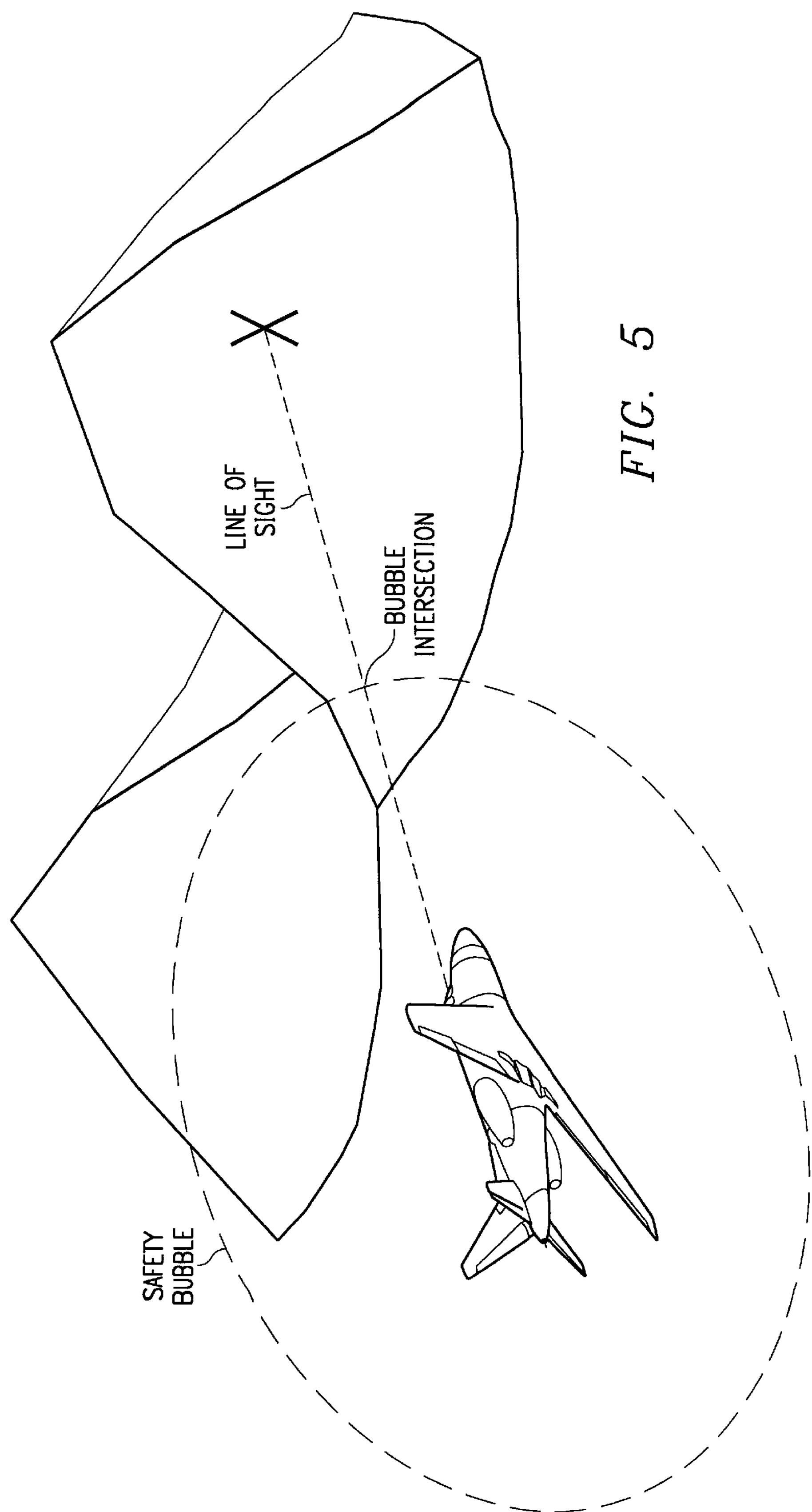
FIG. 5 illustrates the "safe-distance" bubble parameter that causes the audible and/or visual indicator to enunciate, according to the present invention.

From the rate of travel of the vehicle, it can then be determined if the polygon lies within another configurable parameter, the "safe-distance" bubble of the vehicle. The "safe-distance" bubble parameter is set by the operator of the vehicle and allows the digital computer system 10 to be easily used in conjunction with vehicles of different sizes, such as with a smaller, slower vehicles or faster, larger vehicles. After the size of the "safe-distance" bubble parameter has been set by the operator, should a polygon within the 3-D image come within the "safe-distance" bubble of the vehicle, an audible and/or visual indicator such as an alarm will inform the operator. The bubble intersection caused by a polygon invading the safe area established by the "safe-distance" bubble parameter that causes the audible and/or visual indicator to enunciate is shown in FIG. 5.

In the 3-D image presented to the operator of the vehicle, the polygons of that image have color, texture and other indicators which indicate what type of surface is being represented. For instance, Dark Blue may be representative of water, Green-Land representative of Sky-Blue, Gray representative of Buildings or other protruding land masses, and White representative of surfaces above the "tree-line". Since the database shall be generated prior to "run-time" and shall be stored on a storage device, such as a CD-ROM or other storage device, the color, texture, and other indicators conveyed by the polygon is pre-determined and used by the 3-Dimensional render engine provided by Image Generation Processing 24 at run-time. Coloring the polygons allows for a "baseline" color before any shading has occurred. Subsequent shading provides motion queuing to the operator of the vehicle as the vehicle traverses through the database.

Figure 6:
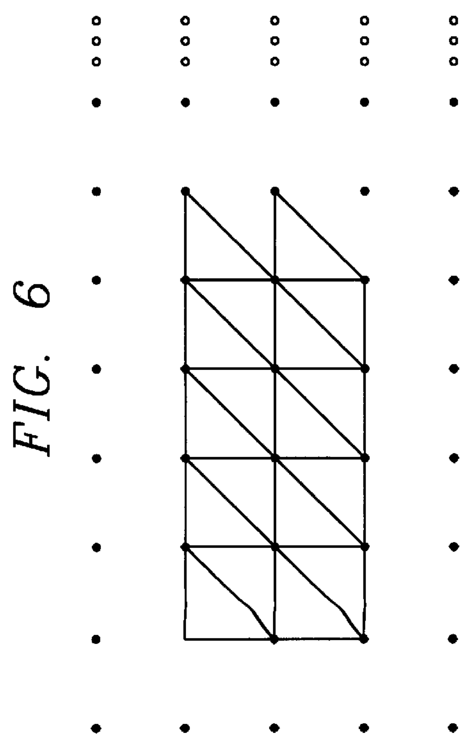
FIG. 6 illustrates the polygons set for 3 position points which define the 3-D virtual image, according to an embodiment of the present invention.

The polygons of the 3-D image are defined by taking 3 position points from the terrain database 18 in order to generate a flat surface for the render engine represented by Image Generation Processing 24 at that point in the 3-D image. By using multiples of these triplets of terrain data, an fairly accurate rendition of the surface can be developed by the Image Generation Processing 24. The definition of the polygons of the 3-D image by 3 position points is illustrated by FIG. 6.

The digital computer system 10 can optionally display a "cross-hair" in the center to of the display which depicts the projected flight path of the vehicle. Should this cross-hair intersect with a rendered polygon inside the safety bubble, a visual and/or audible alert will either flash or sound requiring the operator to acknowledge this intersection. The device allows the operator to select either a cockpit view or a trailing view, which depicts a view of the vehicle in the 3-D scene as seen from behind the vehicle. Obviously, the 3-D image produced by Display block 26 should be within easy viewing distance of the operator in the vehicle.

The operator of the vehicle uses the digital computer system of the present invention when nighttime or other restricted visibility conditions precipitate the need for the operator to be able to "see" the terrain over which the vehicle is traveling in spite of the restricted visibility conditions. The present invention is not intended to be used as the sole navigational device in inclement weather or lighting conditions, but rather serves as a supplemental device to assist conventional IFR navigational devices. The operator of the vehicle is to use the present invention when questions of location, or outside conditions warrant the use of the device to "see" into otherwise blind conditions. Because operation of the digital computer system is independent all other navigational instruments, save for the GPS system on-board the vehicle, the digital computer system is capable as serving as a secondary back-up device for all other navigational instruments on-board the vehicle.

While the invention has been particularly shown and described with reference to a preferred embodiment, it will be understood by those skilled in the art that various changes in form and detail may be made therein without departing from the spirit and scope of the invention.

What is claimed is:

1. A digital computer system that correlates positional input data for generating a 3-D virtual image, representational of a localized terrain over which a vehicle is traveling, comprising:

a positional information unit which receives the positional input data provided by a satellite-based positioning system;

a terrain database unit, containing data of the localized terrain over which the vehicle is traveling; and a location calculation unit which receives the positional input data from the positional information unit and generates a most recent spatial location of the vehicle in the localized terrain over which the vehicle is traveling;

an image generation processing unit having a render engine which receives data from the positional information unit and the terrain database unit and which generates the 3-D virtual image representational of the terrain over which the vehicle is traveling, wherein the image generation processing unit generates the 3-D virtual image by referencing the most recent spatial location of the vehicle in the localized terrain over which the vehicle is traveling in order to compute a heading, a pitch, and a directional vector of a current position of the vehicle, wherein the most recent spatial location of the vehicle is generated by the location calculation unit.

2. The system of claim 1, wherein the heading and the pitch of the current position of the vehicle are computed through the use of a lookup table.

3. The system of claim 1, wherein the system further comprises:

a radar information unit that provides radar data to the image generation processing unit, wherein the image generation processing unit incorporates the radar data from the radar information unit with data from the terrain database unit and the positional information unit to generate the 3-D virtual image representative of the terrain over which the vehicle is traveling.

4. The system of claim 3, wherein the radar information unit is a weather radar system and the radar data is representative of weather conditions.

5. The system of claim 3, wherein the radar information unit is a traffic collision avoidance system (TCAS) and the radar data is representative of vehicular traffic.

6. A digital computer system that correlates positional input data for generating a 3-D virtual image, representational of a localized terrain over which a vehicle is traveling, comprising:

a positional information unit which receives the positional input data provided by a satellite-based positioning system;

a terrain database unit, containing data of the localized terrain over which the vehicle is traveling; and an image generation processing unit having a render engine which receives data from the positional information unit and the terrain database unit and which generates the 3-D virtual image representational of the terrain over which the vehicle is traveling, wherein the image generation processing unit generates the 3-D virtual image by referencing a most recent spatial location of the vehicle in the localized terrain over which the vehicle is traveling in order to compute a heading and a pitch of a current position of the vehicle, wherein the most recent spatial location of the vehicle is generated by a location calculation unit which receives the positional input data from the positional information unit.

7. The system of claim 6, wherein the heading and the pitch of the current position of the vehicle are computed through the use of a lookup table.

8. The system of claim 6, wherein the system further comprises:

a radar information unit that provides radar data to the image generation processing unit, wherein the image generation processing unit incorporates the radar data from the radar information unit with data from the terrain database unit and the positional information unit to generate the 3-D virtual image representative of the terrain over which the vehicle is traveling.

9. The system of claim 8, wherein the radar information unit is a weather radar system and the radar data is representative of weather conditions.

10. The system of claim 8, wherein the radar information unit is a traffic collision avoidance system (TCAS) and the radar data is representative of vehicular traffic.

11. method for generating a 3-D virtual image representational of a localized terrain over which a vehicle is traveling, comprising the steps of:

receiving positional input data provided by a satellite-based positioning system which provides latitude data, longitude data, altitude data, and time data to define a spatial location representative of an eye point position seen by an operator of the vehicle in the terrain over which the vehicle is traveling;

deriving an initial positional reading of the vehicle at time T1 from a sampled GPS data, wherein the initial positional reading at time T1 is represented as $A=(X_1, Y_1, Z_1, T_1)$ where $X_1$ is representative of latitude at time $T_1$, $Y_1$ is representative of longitude at time $T_1$, and $Z_1$ is representative of altitude at time $T_1$;

deriving a subsequent positional reading of the vehicle at time T2 from the sampled GPS data, wherein the subsequent positional reading at time T2 is represented as $B=(X_2, Y_2, Z_2, T_2)$ where $X_2$ is representative of latitude at time T2, $Y_2$ is representative of longitude at time T2, and $Z_2$ is representative of altitude at time $T_2$;

calculating a directional vector of the vehicle defined as the vector AB;

calculating the velocity of the vehicle according to the equation:

$$\frac{\sqrt{(x_2-x_1)^2+(y_2-y_1)^2+(z_2-z_1)^2}}{(t_2-t_1)}$$

generating a computer image representative of the eye point position seen by the operator of the vehicle and the directional vector of the vehicle, wherein the computer image is generated by a render engine of an image generation processing unit; and overlaying the computer image representing the eye point position and the directional vector of the vehicle onto a simulated image of the terrain over which the vehicle is traveling to generate a 3-D virtual image.

12. The method of claim 11, comprising the further step of:

displaying the 3-D virtual image.

13. The method of claim 11, wherein the sampled global positioning satellite (GPS) data is differential global positioning satellite data.

14. The method of claim 11, wherein the step of overlaying the computer image representing the eye point position and the directional vector of the vehicle onto the simulated image to generate the 3-D virtual image is accomplished by an image generation processing block of a digital computer system.

15. The method of claim 11, wherein the step of receiving positional input data is accomplished by periodically sampling global positioning satellite (GPS) data.

16. The method of claim 15, wherein the GPS data is preferably sampled as often as possible.

17. The method of claim 16, wherein the GPS data is sampled at least every ½ second.

18. A digital computer system that correlates differential positional input data for generating a 3-D virtual image, representational of a localized terrain over which a vehicle is traveling, comprising:

a positional information unit which receives the differential positional input data provided by a satellite-based positioning system, wherein the differential positional input data is a differential GPS data provided from a Global Positioning Satellite (GPS) unit;

a terrain database unit, containing data of the localized terrain over which the vehicle is traveling;

an image generation processing unit having a render engine which receives differential data from the positional information unit and the terrain database unit and which generates the 3-D virtual image representational of the terrain over which the vehicle is traveling; and a radar information unit that provides radar data to the image generation processing unit, wherein the image generation processing unit incorporates the radar data from the radar information unit with data from the terrain database unit and the positional information unit to generate the 3-D virtual image representative of the terrain over which the vehicle is traveling.

19. The system of claim 18, wherein the radar information unit is a weather radar system and the radar data is representative of weather conditions.

20. The system of claim 18, wherein the radar information unit is a traffic collision avoidance system (TCAS) and the radar data is representative of vehicular traffic.

* * * * *

US005995903C1

(12) EX PARTE REEXAMINATION CERTIFICATE (9436th)

United States Patent

Smith et al.

(10) Number: US 5,995,903 C1
(45) Certificate Issued: Dec. 13, 2012

(54) METHOD AND SYSTEM FOR ASSISTING NAVIGATION USING RENDERED TERRAIN IMAGERY

(75) Inventors: Eric L. Smith, North Richland Hills, TX (US); Kurt Zimmerman, Plano, TX (US)

(73) Assignee: Taranis IP LLC, Plano, TX (US)

Reexamination Request:
No. 90/011,734, Jun. 9, 2011

Reexamination Certificate for:

| | |
|---|---|
| Patent No.: | **5,995,903** |
| Issued: | **Nov. 30, 1999** |
| Appl. No.: | **08/745,827** |
| Filed: | **Nov. 12, 1996** |

(51) Int. Cl.
*G08G 1/137* (2006.01)
*G01C 21/00* (2006.01)

(52) U.S. Cl. .............. 701/470; 340/995.26; 342/357.52; 701/454; 701/468; 701/514

(58) Field of Classification Search ........................ None
See application file for complete search history.

(56) References Cited

To view the complete listing of prior art documents cited during the proceeding for Reexamination Control Number 90/011,734, please refer to the USPTO's public Patent Application Information Retrieval (PAIR) system under the Display References tab.

*Primary Examiner* — Jeffrey L. Gellner

(57) ABSTRACT

A digital computer system for displaying a computer generated terrain representing a 3-dimensional depiction of the real world terrain surrounding a vehicle in real-time while the vehicle is in motion. This 3-D (3-Dimensional) image is rendered in real time while the vehicle is in motion and uses Global Positioning System (GPS) or differential GPS (dGPS) data available from a GPS unit and translates that data into virtual space within an Image Generation Processing block of the digital computer system. The digital computer system generates a virtual world 3-D image representing the eye-point position of the vehicle and directional vector into a terrain database. Using the latitude, longitude, and altitude supplied from the GPS unit as the eye point position into a virtual world using a terrain database, the Image Generation Processing block has a render engine capable of rendering a depiction of the terrain outside of the vehicle, as would be seen in high visibility conditions, regardless of weather, lighting and atmospheric conditions.

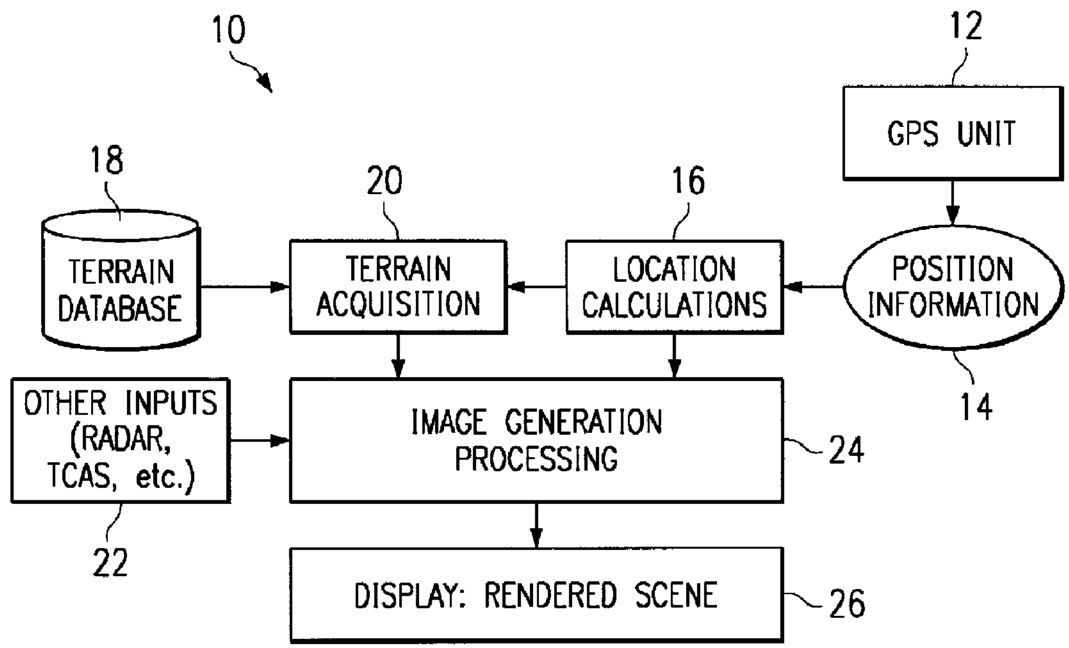

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 18 is determined to be patentable as amended.

Claims 19 and 20, dependent on an amended claim, are determined to be patentable.

New claims 21-26 are added and determined to be patentable.

Claims 1-17 were not reexamined.

18. A digital computer system that correlates differential positional input data for generating a 3-D virtual image, representational of a localized terrain over which a vehicle is traveling, comprising:

a positional information unit which receives the differential positional input data provided by a satellite-based positioning system, wherein the differential positional input data is a differential GPS data provided from a Global Positioning Satellite (GPS) unit;

a terrain database unit, containing data of the localized terrain over which the vehicle is traveling;

an image generation processing unit having a render engine which receives differential data from the positional information unit and the terrain database unit and which generates the 3-D virtual image representational of the terrain over which the vehicle is traveling; and a radar information unit that provides radar data to the image generation processing unit, wherein the image generation processing unit incorporates the radar data from the radar information unit with data from the terrain database unit and the positional information unit to generate the 3-D virtual image representative of the terrain over which the vehicle is traveling*;*

*wherein the 3-D virtual image comprises filled polygons defined by taking three position points from the terrain database unit*.

*21. The system of claim 18, wherein the 3-D virtual image comprises a depiction of the real-world terrain outside the vehicle.*

*22. The system of claim 18, wherein the 3-D virtual image does not include a wire-frame image.*

*23. The system of claim 18, wherein a vehicle heading, vehicle pitch, or both are derived from the differential GPS data.*

*24. The system of claim 18, wherein a vehicle heading, vehicle pitch, or both are derived from the differential GPS data independent of all other navigational instruments.*

*25. The system of claim 18, wherein the polygons are textured.*

*26. The system of claim 18, wherein the polygons are shaded.*

* * * * *